United States Patent [19]

Pohl

[11] 4,275,920
[45] Jun. 30, 1981

[54] SLIDING ROOF PANEL

[75] Inventor: Lothar Pohl, Sterling Heights, Mich.

[73] Assignee: Wisco Corporation, Ferndale, Mich.

[21] Appl. No.: 30,558

[22] Filed: Apr. 16, 1979

[51] Int. Cl.³ .............................................. B60J 7/04
[52] U.S. Cl. ................................................... 296/222
[58] Field of Search .......... 296/137 E, 137 C, 137 D, 296/137 B, 137 F, 137 H, 137 G, 137 R, 136, 216–224

[56] References Cited

U.S. PATENT DOCUMENTS

| 1,826,871 | 11/1931 | Ford | 296/220 |
| 2,203,931 | 6/1940 | Solomon et al. | 296/216 |
| 2,215,022 | 9/1940 | Votypka | 296/137 B |
| 3,949,624 | 4/1976 | Bienert | 296/137 B X |
| 3,960,403 | 6/1976 | Carella et al. | 296/137 B |
| 3,981,531 | 9/1976 | Koral et al. | 296/137 G |

FOREIGN PATENT DOCUMENTS

| 524303 | 12/1953 | Belgium | 296/137 B |
| 54592 | 6/1966 | German Democratic Rep. | 296/137 E |

Primary Examiner—John J. Love
Assistant Examiner—Norman L. Stack, Jr.
Attorney, Agent, or Firm—Basile, Weintraub & Hanlon

[57] ABSTRACT

A sliding roof panel for selectively covering or uncovering an opening in a vehicle is disclosed. The panel is supported by a pair of spaced apart parallel tracks disposed longitudinally above the vehicle roof on each side of the opening. The panel is movable from a first position wherein it is biased against the vehicle roof over the opening to a second position wherein the panel is raised above the vehicle roof and the supporting tracks to a third position wherein the panel is moved along the tracks uncovering the opening. A linkage actuated by a pivoting handle moves the panel from the first position to the second position. A cam operated interlock allows the panel to be moved from its first to its second position or from its second position to its first position only when the panel is vertically over the roof opening. The panel can be moved by hand from its first, to its second, and to its third position; and from its third to its second to its first position. In a preferred embodiment, the panel is movable to the various positions by an electrically operated, longitudinally movable cable.

8 Claims, 3 Drawing Figures

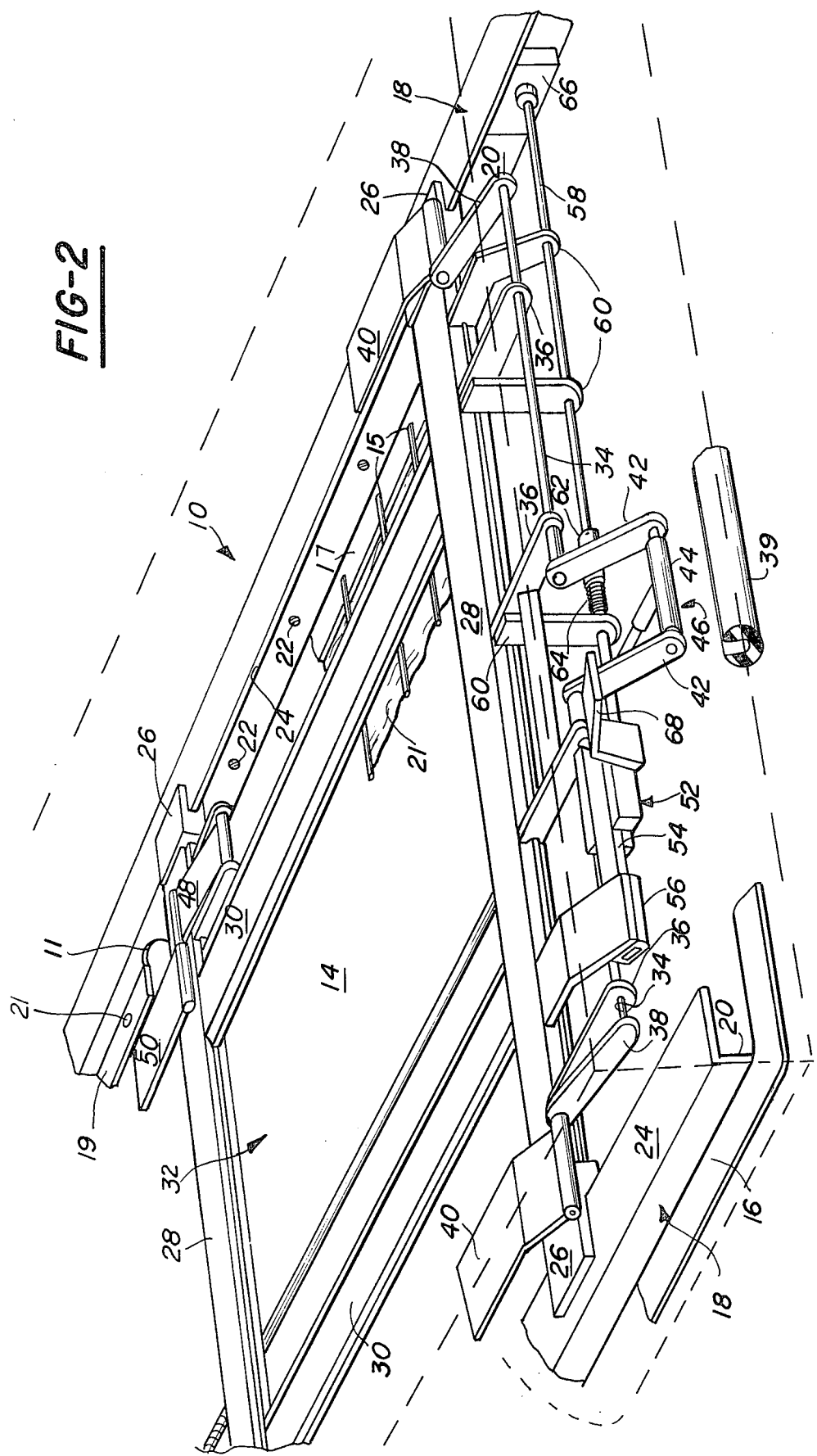

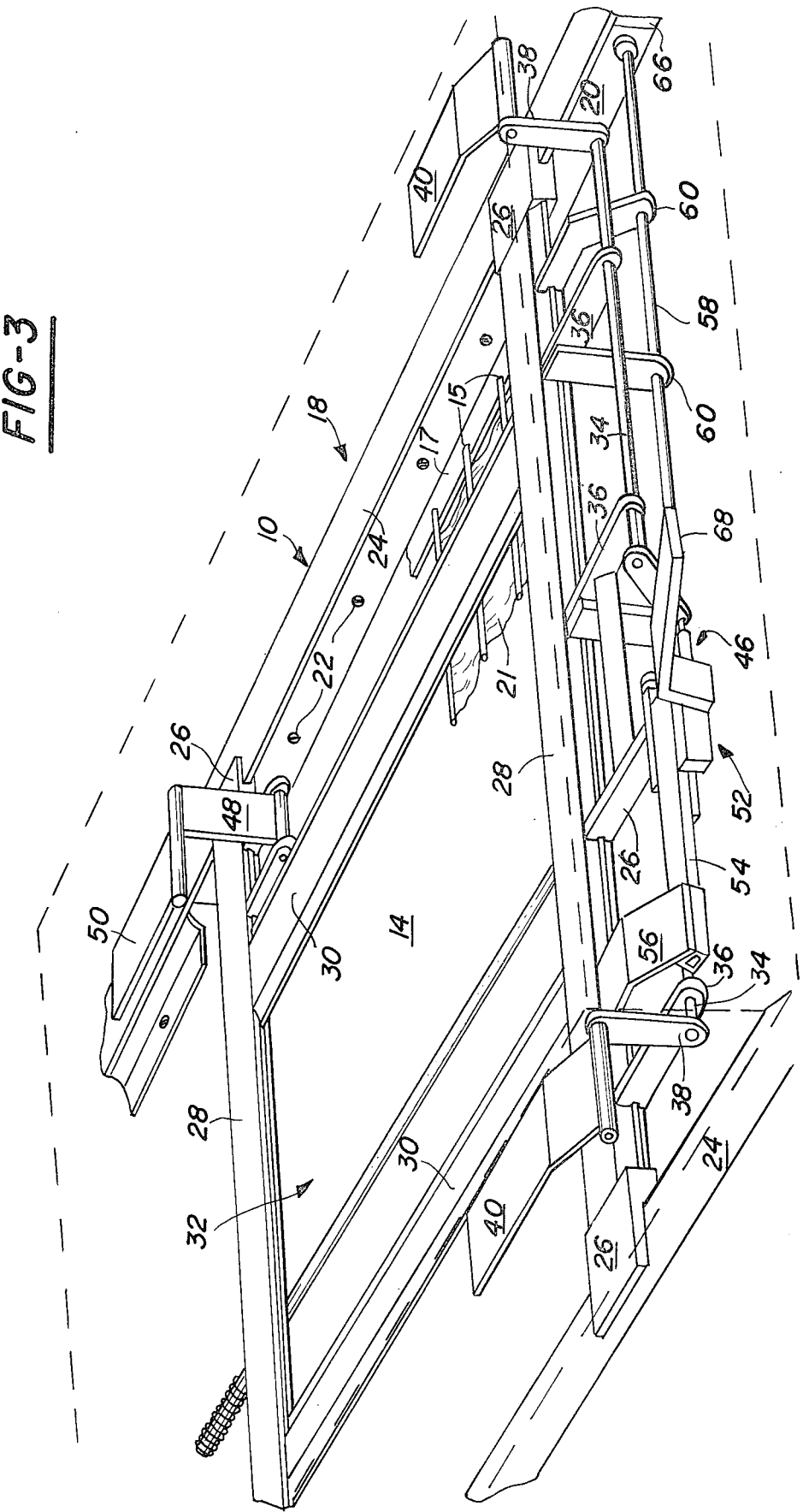

SLIDING ROOF PANEL

BACKGROUND OF THE INVENTION

I. Field of the Invention

The present invention relates to the field of sliding roof panels for selectively opening or covering an opening in a vehicle roof. More particularly the present invention relates to the field of sliding roof panels that are slidable from a first position covering an opening in a vehicle roof to a second position vertically above the opening, to a third position uncovering the opening, the panel being slidable along a longitudinally disposed tracks. Even more particularly, the present invention relates to the field of sliding roof panels which are vertically displaced above a guiding track for movement along the track from a first position covering the vehicle opening to a second position vertically above the opening, to a third position uncovering the vehicle opening.

II. Description of the Prior Art

U.S. Pat. No. 2,215,022 discloses a sliding roof panel for selectively opening or covering an opening in a vehicle roof. U.S. Pat. No. 2,215,022 discloses a pair of spaced apart tracks on either side of the opening with the panel supported and slidable along the tracks. This United States patent does not disclose a panel which is raised above the track for movement therealong.

U.S. Pat. No. 3,949,624 discloses a linkage for raising a roof vent above the roof line of the vehicle. This United States patent does not disclose a panel which is raised above a track for movement therealong.

U.S. Pat. No. 3,960,403 discloses a retractable roof closure which moves along a track disposed beneath the roof of the vehicle.

U.S. Pat. No. 3,981,531 discloses an operating mechanism for a roof opening closure which includes a track extending longitudinally beneath the roof of the vehicle. This patent discloses a roller and lifting link for lifting the panel against a gasket when the panel is in place for closing the vehicle opening.

None of the above listed United States patents disclose a sliding roof panel for selectively covering or uncovering an opening in a vehicle roof which is slidable along a pair of spaced apart tracks disposed longitudinally on either side of the opening, the panel being vertically raised above the tracks for movement therealong. None of the aforementioned United States patents disclose a sliding roof panel which encloses the track when the panel is in its closed position. The above listed United States patents constitute the entire art known to the applicant and his attorney.

SUMMARY OF THE INVENTION

The present invention comprises a sliding roof panel for selectively covering or uncovering an opening in a vehicle roof which comprises a pair of spaced apart tracks disposed above the roof along either side of the opening, the panel enclosing the tracks and vehicle opening when in a closed position. The panel is movable from a first position closing and sealing the opening, to a second position spaced above the vehicle roof and the tracks, to a third position displaced along the tracks uncovering the opening.

A plurality of guides engage the tracks for movement along the tracks. A support frame for supporting the panel extends between the tracks and is supported by the guides, and a pair of pivoting rods, pivoted by a handle, are rotatably supported by the frame. A pair of pivots are affixed at a lower end to an outer end of the rods for rotation therewith, and the upper end of the pivots is hinged to the panel. In a first position the link biases the panel against the roof, and in a second position the link raises the panel above the tracks, clearing the panel for movement along the track.

An interlock means is employed to allow movement of the link from the first position to the second position and from the second position to the first position only when the panel is positioned over the vehicle opening.

A pivoting handle is employed to rotate the pivoting rods and the pivots and to deploy the panel between the first position and the second position.

The panel as defined in the present invention is movable by hand from the first position covering the vehicle opening to the second position spaced above the vehicle roof and the tracks, and to the third position uncovering the opening. In a preferred embodiment the panel is movable from the position covering the vehicle opening, to the second position spaced above the vehicle opening and tracks, to the third position moved laterally along the tracks uncovering the opening using an electrically powered, longitudinally movable cable.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention is read in conjunction with the accompanying drawings.

BRIEF DESCRIPTION OF THE DRAWINGS

In the drawings, like reference numbers refer to like parts throughout the several views, and wherein:

FIG. 2 illustrates a partial broken perspective view of the panel of the present invention in a closed position; and FIG. 3 illustrates the mechanism of FIG. 2 with the panel deployed to a position spaced above the vehicle opening.

DESCRIPTION OF THE PREFERRED EMBODIMENT

Figure 1:
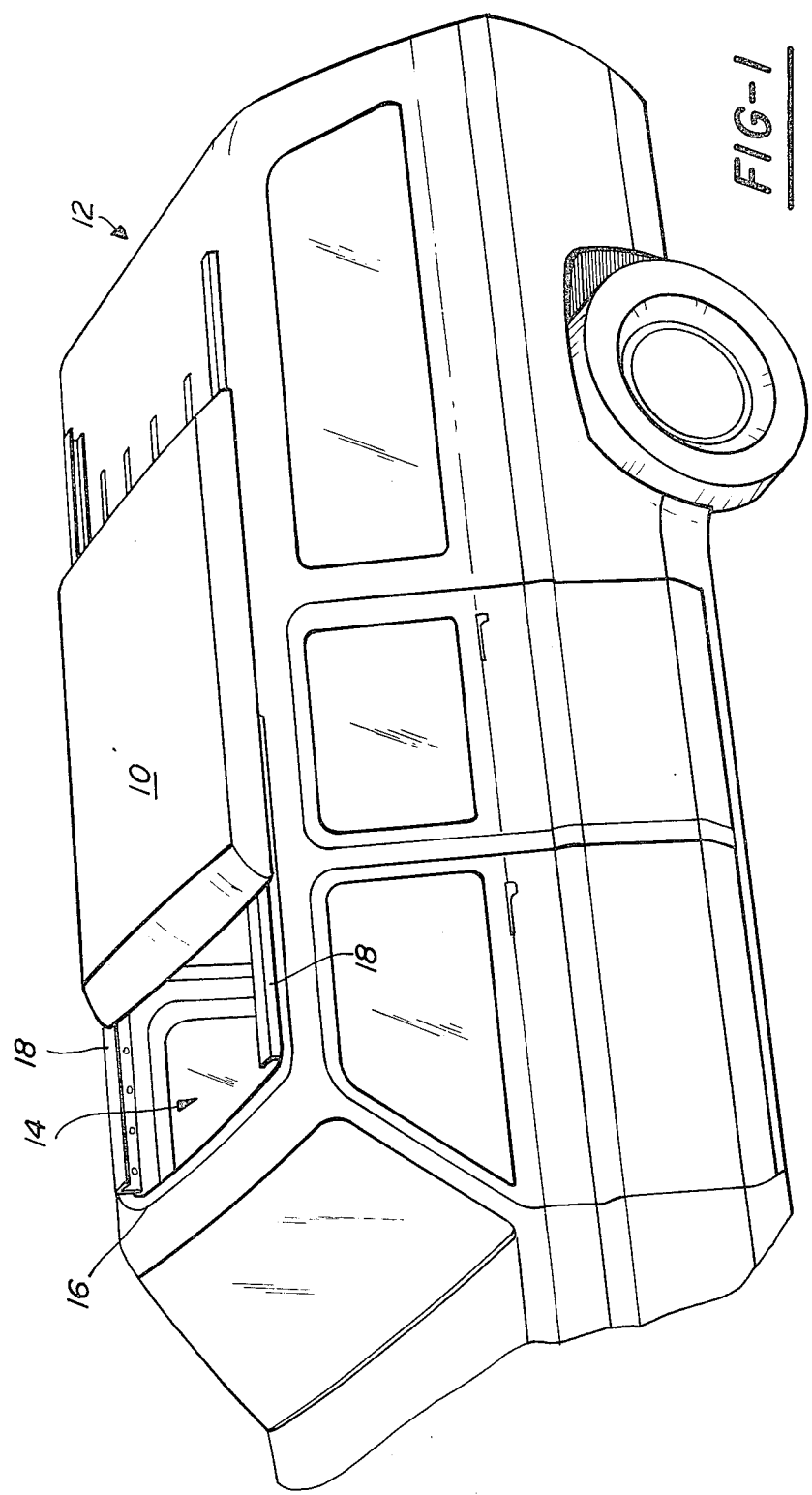
FIG. 1 illustrates a broken perspective view of a vehicle employing the panel of the present invention.

Referring now to the drawings, and in particular to FIG. 1, there is shown one example of the present invention in the form of a panel 10 carried by a vehicle 12. The panel of the present invention is equally applicable to automobiles, trucks, vans, recreation vehicles, and the like.

In accordance with the present invention, an opening 14 is formed in the roof usually over the front seat of the vehicle, and the perimeter of the opening is finished with a frame member 16. The frame member 16 is adapted to finish the opening in the vehicle roof and secure a pair of tracks 18 disposed above the roof along either side of the opening. The panel 10 encloses the forward portion of the tracks 18 and the vehicle opening 14 when it is in a closed position.

The panel 10 is movable from a first position closing and sealing the opening, to a second position spaced above the tracks, clearing the tracks for movement along the tracks, to a third position displaced along the tracks uncovering the opening.

Each track 18 (FIG. 2) comprises a vertical wall 20 affixed to an inner wall of the frame member 16 by a plurality of threaded fasteners 22 which pass through a plurality of openings (not shown) in the wall 20 and engage a plurality of threaded apertures (not shown) in the frame member 16 to affix the track 18 to the frame. An opening 11 is created in the wall 20 where the track passes a rear portion of the frame member 16 to clear the frame. Rearward of the opening 11, a lower portion of the wall 20 extends horizontally forming a flange 19 to abut the vehicle roof. The flange 19 is affixed to the roof by a plurality of threaded fasteners 21 passing through a plurality of apertures (not shown) in the flange to engage a plurality of threaded apertures (not shown) in the roof.

A horizontal wall 24 of the track extends laterally inward to slidingly support a pair of spaced apart guides 26 along each track 18. Opposing guides 26 support a pair of spaced apart transverse members 28, and the transverse members are held in a spaced relationship by a pair of spaced apart longitudinal members 30. The guides 26, the transverse members 28, and the longitudinal members 30 are all joined together to define a support frame 32 which is slidable along the tracks 18.

A pair of opposed pivoting rods 34 are rotatably supported to the support frame 32 by a plurality of bearings 36. The outward ends of the pivoting rods 34 have attached thereto a pair of pivoting links 38 for rotation with the pivoting rods 34. The upper end of each pivoting link 38 is pivotally attached to the panel by forward hinge members 40. The inner ends of the pair of opposed pivoting rods 34 are affixed to a pair of downward extending arms 42, and a lower end of the arms 42 are joined together by a transverse handle 44 to form a pivoting handle 46. Rotation of the handle 46 causes a similar rotation of the pivoting rods 34 and the pivoting links 38. When the handle 46 and the links 38 are in a first position as illustrated in FIG. 2, the panel 10 is biased against the roof of the vehicle, squeezing a gasket 39 between the lower edge of the panel and the roof. In a second position as illustrated in FIG. 3 the links 38 raise the panel 10 above the tracks 18 to allow movement of the panel along the tracks.

A pair of spaced apart rear links or hinges 48 are pivoted at their lower end to the support frame 32 and are pivotally attached to the panel 10 at their upper end by means of a pair of rearward hinges 50. As the pivoting links 38 pivot from the first position biasing the panel 10 toward the vehicle roof to the second position spacing the panel 10 above the tracks 18, a complementary movement of the links 48 and links 50 raises the rear portion of the panel 10 above the tracks 18. When the panel has been deployed to its second position spaced above the tracks 18, movement of the panel 10 along the tracks to a third position uncovering the vehicle opening is possible without interference between the panel 10 and the tracks 18.

When the panel 10 has been moved along the tracks 18 to the third position to uncover the opening 14, rotation of the pivoting links 38 to deploy the panel downward would cause the panel to interfere with the tracks 18 and cause damage to the tracks or the panel. To prevent lowering of the panel 10 when the panel is not deployed over the opening 14, an interlock mechanism 52 is employed. The interlock 52 comprises a lock member 54, transversely slidingly supported by a frame mounted bearing 56, and an actuator rod 58 slidingly supported by a plurality of frame member slide bearings 60 which allow a sliding motion of the rod 58. An inner end of the rod 58 is fixedly attached to the lock mechanism 54 such that the lock mechanism 54 and the actuator rod 58 move transversely together. A collar 62 is fixedly attached to the actuator rod 58 near one of the slide bearings 60, and a spring 64 has one end abutting the slide bearing 60 and the other end abutting the collar 62, biasing the actuator rod 58 transversely outward. A linear cam 66 is affixed to a vertical wall 20 of the track 18 and is positioned to transversely move the actuator rod 58 inward against the biasing spring 64 when the panel 10 is positioned over the vehicle opening 14. The lock mechanism 54 has attached thereto an upward and forward extending arm 68 which moves laterally outward when the panel has been moved rearward and the actuator rod 58 has been allowed to extend outward as the rod end leaves the cam 66. The arm 68 interferes with the rotation of the handle 46 when moved transversely outward to prevent rotation of the handle 46 and a lowering of the panel 10 when the panel 10 is not positioned over the vehicle opening. Thus it is readily apparent that when the handle 46 has been rotated to the second position raising the panel 10 above the tracks 18 and the panel has been displaced rearward a distance and the panel is not directly over the opening, the lock 54 prevents the handle 46 from being returned to the first position until the panel 10 has been returned to a position directly over the opening 14 and the actuator rod 58 has been displaced inward by the cam 66 to move the lock 54 inward and remove the arm 68 from interference with the rotation of the handle 46. This allows the panel 10 to be lowered into sealing abutment with the vehicle roof only when the panel is over the opening.

It is apparent to the skilled artisan that the panel 10 can be deployed from a first position in biasing abutment with the vehicle roof by hand rotation of the handle 46 into a second position where the panel 10 is raised above the tracks 18. The panel may also be deployed from the second position spaced above the tracks 18 to the third position uncovering the opening 14 by hand sliding the panel rearward.

In a preferred embodiment the panel is movable from the first position in abutment with the vehicle roof to the second position raised above the tracks 18 and slid along the tracks 18 to the third position uncovering the opening 14 by means of an electrically powered, longitudinally movable cable as is commercially available in the trade known as "teleflex" drive cable.

The frame member 16 includes an inward projecting lip 17 spaced down a distance from the vehicle roof and extending around the periphery of the frame. A plurality of parallel spaced transverse rods 15 span the opening 14 and are supported on opposite sides by the lip 17. A folding fabric headliner 21 covers the handle and interlock and is supported by the rods. A forward end of the headliner is attached to a forward transverse portion of the support frame 32 (not shown). A rearward transverse portion of the headliner is attached to a rear portion of the lip 17. When the panel opens, the headliner 21 folds accordion style as the panel moves rearward.

There has been described hereinabove a sliding roof panel for selectively covering or uncovering an opening in a vehicle roof by sliding a panel along a pair of spaced apart tracks disposed above the roof along either side of the opening. The panel encloses the tracks and the vehicle opening sealing the panel against the vehicle roof when in a closed position. The panel is movable from a first position closing and sealing the opening, to a second position spaced above the tracks, and to a third position displaced along the tracks uncovering the opening. While a sliding roof panel for selectively covering or uncovering an opening in a vehicle roof is disclosed, it is obvious to the skilled artisan that the panel of this invention can be employed to selectively open or close a surface either horizontal or vertical in a vehicle, vessel, dwelling, or the like.

Having thus described my invention, what I claim is:

1. A sliding roof panel for selectively covering or uncovering an opening in a vehicle roof comprising:
   a pair of spaced apart tracks attached to the roof projecting above the roof along sides of the opening;
   the panel including downward extending co-operating front, rear and side walls extending to the roof and enclosing the tracks and vehicle opening when in a closed position;
   the panel movable from a first position with the downward extending walls abutting the roof closing and sealing the opening, to a second position spaced above the tracks for movement therealong, and to a third position displaced along the tracks uncovering the opening.

2. The sliding roof panel as defined in claim 1 further comprising:
   one or more guides engaging the tracks for movement therealong;
   a support frame extending between tracks supported by the guides;
   one or more pivoting rods rotatably supported by the frame;
   one or more pivoting links affixed at a lower end to the rod for rotation therewith and pivotally attached to the panel at an upper end wherein in a first position the link biases the panel against the roof, and in a second position the link raises the panel above the tracks; and
   means for moving the link from the first position to the second position.

3. The roof panel as defined in claim 2 further comprising an interlock means for allowing movement of the link from the first position to the second position and from the second position to the first position only when the panel is positioned over the opening.

4. The roof panel as defined in claim 2 wherein the means for moving the link from the first position to the second position comprises:
   a pivoting handle comprising a transverse grip;
   a pair of upward projecting radial arms affixed to the ends of the grip;
   an upper end of the arms fixedly attached to the pivoting rods;
   the rods extending transversely outward, each rod rotatingly supported by a pair of spaced apart bearings attached to the frame;
   an outer end of the rods fixedly attached to a lower end of the link; and
   wherein rotation of the handle to a first position biases the panel against the roof, and rotation of the handle to a second position raises the panel above the tracks.

5. The roof panel as defined in claim 3 wherein means for allowing movement of the link from the first position to the second position and from the second position to the first position only when the panel is positioned over the opening comprises:
   a transverse actuator rod slidingly supported by one or more bearings attached to the frame;
   an outer end of the transverse rod biased toward a cam;
   the cam engaging and biasing the transverse rod inward when the panel is over the roof opening; and
   an interlock attached to an inner end of the transverse rod transversely positioned to prevent rotation of the handle when the rod is biased outward.

6. The panel as defined in claim 5 wherein the panel is movable by hand from the position covering the vehicle opening to the position uncovering the vehicle opening by hand rotating the handle from the first position to the second position and longitudinally moving the panel along the tracks to uncover the opening, and movable from the position uncovering the opening to the position covering the opening by longitudinally moving the panel by hand along the tracks to the position over the opening and hand rotating the lever to the first position.

7. The panel as defined in claim 5 wherein the panel is movable from the position covering the vehicle opening by rotating the handle from the first position to the second position and longitudinally moving the panel along the tracks to uncover the opening, and the panel is movable from the position uncovering the opening to the position covering the opening by longitudinally moving the panel along the tracks to the position over the opening and rotating the lever to the first position using an electrically powered longitudinally movable cable.

8. The panel as defined in claim 5 further comprising:
   a frame to finish the vehicle opening;
   an inward projecting lip spaced down a distance from the roof;
   a plurality of parallel spaced transverse rods spanning the opening and supported at their ends by the lip; and
   a folding fabric headliner supported by the rods covering the handle and interlock, the headliner attached at a forward end to a forward transverse portion of the frame and at a rearward end to a rear portion of the lip, the headliner folding as the panel moves to the third position.

* * * * *